(12) United States Patent
Henry et al.

(10) Patent No.: US 8,388,268 B2
(45) Date of Patent: Mar. 5, 2013

(54) CUTTING ASSEMBLY

(75) Inventors: Nicholas J. Henry, Latrobe, PA (US);
Charles L. Conway, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 43 days.

(21) Appl. No.: 13/041,623

(22) Filed: Mar. 7, 2011

(65) Prior Publication Data
US 2012/0230780 A1    Sep. 13, 2012

(51) Int. Cl.
*B23B 27/10*    (2006.01)
*B23B 27/04*    (2006.01)

(52) U.S. Cl. ......... 407/11; 407/117; 407/101; 407/109

(58) Field of Classification Search ............ 407/11, 407/91, 110, 50, 109, 107, 111, 117; 408/56, 408/57, 59; *B23B 27/10, 27/04*
See application file for complete search history.

(56) References Cited

U.S. PATENT DOCUMENTS

| 3,844,008 | A | * | 10/1974 | Sletten | 407/88 |
| 3,889,520 | A | * | 6/1975 | Stoferle et al. | 73/37.5 |
| 4,621,547 | A | * | 11/1986 | Yankoff | 82/1.11 |
| 4,848,198 | A | * | 7/1989 | Royal et al. | 82/1.11 |
| 5,112,164 | A | * | 5/1992 | Pano | 407/110 |
| 5,272,945 | A | * | 12/1993 | Lockard | 82/1.11 |
| 5,340,242 | A | * | 8/1994 | Armbrust et al. | 407/11 |
| 5,439,327 | A | | 8/1995 | Wertheim | |
| 5,709,508 | A | * | 1/1998 | Barazani et al. | 407/101 |
| 5,718,156 | A | * | 2/1998 | Lagrolet et al. | 82/1.11 |
| 5,775,854 | A | | 7/1998 | Wertheim | |
| 5,833,403 | A | * | 11/1998 | Barazani | 407/101 |
| 6,045,300 | A | * | 4/2000 | Antoun | 407/11 |
| 6,186,704 | B1 | * | 2/2001 | Hale | 407/101 |
| 6,261,032 | B1 | | 7/2001 | Duwe et al. | |
| 6,299,388 | B1 | * | 10/2001 | Slabe | 407/11 |
| 6,312,199 | B1 | * | 11/2001 | Sjoden et al. | 407/11 |
| 6,471,448 | B1 | * | 10/2002 | Lagerberg | 407/2 |
| 6,705,805 | B2 | | 3/2004 | Lagerberg | |
| 7,252,024 | B2 | * | 8/2007 | Zurecki et al. | 82/1.11 |
| 7,273,331 | B2 | * | 9/2007 | Giannetti | 407/11 |
| 7,641,422 | B2 | | 1/2010 | Berminge et al. | |
| 2007/0283794 | A1 | * | 12/2007 | Giannetti | 82/158 |
| 2008/0124180 | A1 | * | 5/2008 | Breisch | 407/110 |
| 2008/0131215 | A1 | * | 6/2008 | Sjoo | 407/110 |
| 2010/0196105 | A1 | * | 8/2010 | Amstibovitsky et al. | 407/11 |
| 2011/0311323 | A1 | * | 12/2011 | Hecht | 407/11 |

FOREIGN PATENT DOCUMENTS

| DE | 3434653 A1 | * | 4/1985 |
| EP | 1524053 A2 | * | 4/2005 |
| JP | 2000225540 A | * | 8/2000 |
| WO | 2009141815 A1 | | 11/2009 |

* cited by examiner

*Primary Examiner* — Andrea Wellington
*Assistant Examiner* — Sara Addisu
(74) *Attorney, Agent, or Firm* — Larry R. Meenan, Esq.

(57) ABSTRACT

A toolholder has a head region, which contains a slot separating the head region into a lower section and an upper section, with a lower seat and an upper section to retain a cutting insert. The head region contains a coolant entrance passage, which receives coolant from a coolant source, and a coolant delivery passage, which discharges coolant toward a cutting insert. The head region further contains a fastener bore, which receives a fastener. The fastener has an axial fastener bore which provides fluid communication between the coolant entrance passage and a coolant reservoir between the fastener and the fastener bore. The coolant delivery passage communicates with the coolant reservoir to receive coolant, which passed from the coolant entrance passage and through the axial fastener bore into the coolant reservoir.

12 Claims, 5 Drawing Sheets

CUTTING ASSEMBLY

BACKGROUND OF THE INVENTION

The invention pertains to a cutting assembly for removing material from a workpiece. More specifically, the invention pertains to such a cutting assembly that includes a toolholder, which carries a cutting insert, wherein the toolholder provides the capability to supply coolant to the cutting insert.

In a cutting operation, such as, for example, a grooving operation, a grooving or cutting insert engages a workpiece so as to remove material from the workpiece. In some cutting assemblies, an upper seat and a lower seat retain the cutting insert. Exemplary cutting assemblies wherein an upper seat and a lower seat retain a cutting insert are shown in U.S. Pat. No. 6,261,032 to Duwe et al. and PCT Patent Application Publication WO 2009/141815 A1 to Iscar, Ltd.

Material removal operations can generate heat at the interface between the cutting insert and the workpiece. Typically, it is advantageous to provide coolant to the vicinity of the interface between the cutting insert and the workpiece. The following patent documents are exemplary of arrangements that delivery coolant to the vicinity of a cutting insert: U.S. Pat. No. 5,439,327 to Wertheim; U.S. Pat. No. 5,775,854 to Wertheim; U.S. Pat. No. 6,705,805 to Lagerberg; and U.S. Pat. No. 7,641,422 to Berminge et al.

Even though the arrangements disclosed in some of the above patent documents deliver coolant, it remains highly desirable to provide a cutting assembly that delivers in an efficient fashion coolant to the interface between the cutting insert and the workpiece. This is especially true for a cutting operation in which the cutting insert engages the workpiece surface at the outside diameter (i.e., outside workpiece surface) for the purpose of cutting a groove. During the cutting operation, as the depth of the groove increases, the difficulty connected with coolant delivery to the cutting insert-workpiece interface increases. As can be appreciated, it would very beneficial to provide a cutting assembly (and especially a toolholder) that delivers coolant to the cutting insert-workpiece interface even as the depth of the groove increases during the cutting operation.

SUMMARY OF THE INVENTION

In one form thereof, the invention is a toolholder that retains a cutting insert. The toolholder comprises a toolholder body, which has an axial forward end and an axial rearward end, as well as a head region at the axial forward end and a shank region at the axial rearward end. The head region contains a slot separating the head region into a lower section and an upper section wherein the upper section is movable relative to the lower section. The lower section defines a lower seat and the upper section defines an upper seat wherein the lower seat and the upper seat are adapted to retain a cutting insert there between. The head region contains a fastener bore. The head region contains a coolant entrance passage in fluid communication with the fastener bore. The head region contains a coolant delivery passage in fluid communication with the fastener bore wherein the coolant delivery passage has an exit adapted to direct coolant to the cutting insert. A fastener is received within at least a portion of the fastener bore. The fastener has an axial fastener bore with an inlet and an outlet. The axial fastener bore inlet is in fluid communication with the coolant entrance passage and the axial fastener bore outlet is in fluid communication with the fastener bore.

In yet another form thereof, the invention is a cutting assembly comprising a toolholder and a cutting insert. The toolholder has an axial forward end and an axial rearward end, as well as a head region at the axial forward end and a shank region at the axial rearward end. The head region contains a slot separating the head region into a lower section and an upper section wherein the upper section is movable relative to the lower section. The lower section defines a lower seat and the upper section defines an upper seat wherein the lower seat and the upper seat are adapted to retain a cutting insert there between. The head region contains a fastener bore. The head region contains a coolant entrance passage in fluid communication with the fastener bore. The head region contains a coolant delivery passage in fluid communication with the fastener bore wherein the coolant delivery passage has an exit adapted to direct coolant to the cutting insert. A fastener is received within at least a portion of the fastener bore. The fastener has an axial fastener bore with an inlet and an outlet. The axial fastener bore inlet is in fluid communication with the coolant entrance passage and the axial fastener bore outlet is in fluid communication with the fastener bore.

In still another form thereof, the invention is a cutting assembly for removing material from a workpiece, which has a workpiece surface, upon the cutting assembly engaging the workpiece at a cutting insert-workpiece interface. The cutting assembly comprises a toolholder and an elongate cutting insert. The elongate cutting insert has a central longitudinal cutting insert axis wherein the central longitudinal cutting insert axis is generally perpendicular to the workpiece surface. The toolholder has an axial forward end and an axial rearward end. The toolholder has a head region at the axial forward end and a shank region at the axial rearward end. The head region has a narrow axial forward extension, which has a central longitudinal extension axis. The head region contains a slot separating the narrow axial forward extension into a lower axial forward extension section and an upper axial forward extension section wherein the upper axial forward extension section is movable relative to the lower axial forward extension section. The lower axial forward extension section defines a lower seat and the upper axial forward extension section defines an upper seat wherein the lower seat and the upper seat are adapted to retain the elongate cutting insert there between such that the central longitudinal cutting insert axis is generally parallel with the central longitudinal extension axis. The head region contains a fastener bore. The head region contains a coolant entrance passage in fluid communication with the fastener bore. The upper axial forward extension section contains at least a portion of a coolant delivery passage, which has a central longitudinal coolant delivery passage axis. A fastener is received within the fastener bore. The fastener has an axial fastener bore with an inlet and an outlet. The axial fastener bore inlet is in fluid communication with the coolant entrance passage and the axial fastener bore outlet is in fluid communication with the fastener bore. The coolant delivery passage is in fluid communication with the fastener bore, and the coolant delivery passage has an exit in the upper axial forward extension section wherein the exit opens towards the cutting insert-workpiece interface so as to discharge coolant towards the cutting insert in a direction generally parallel to the central longitudinal cutting insert axis.

BRIEF DESCRIPTION OF THE DRAWINGS

The following is a brief description of the drawings that form a part of this patent application.

DETAILED DESCRIPTION

Figure 1:
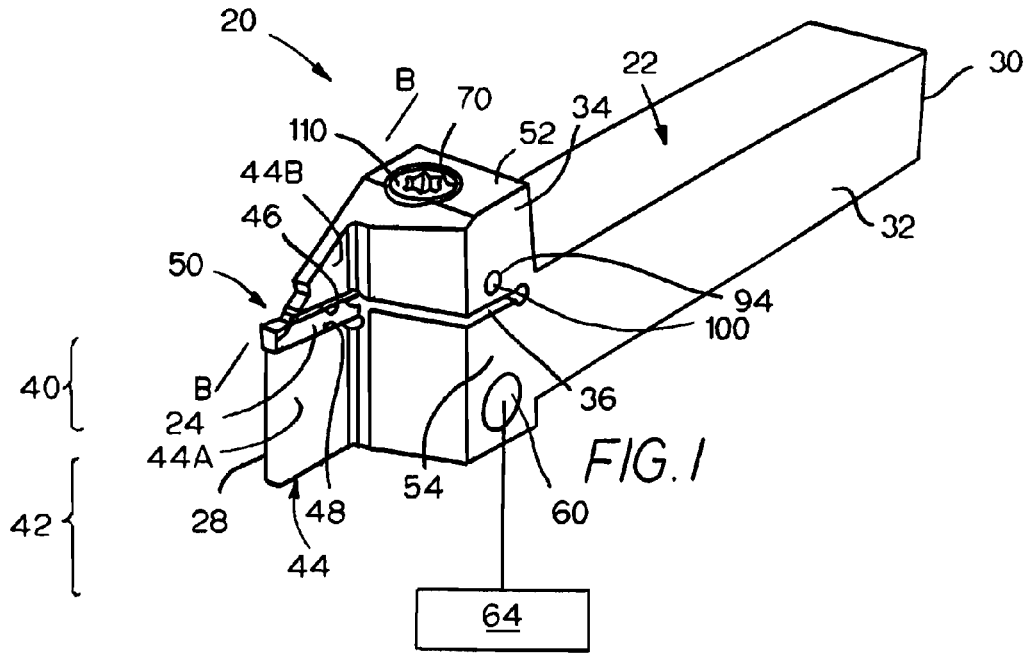
FIG. 1 is an isometric view of the cutting assembly, which has the toolholder and a cutting insert retained by the toolholder.

Referring to the drawings and in particular to FIG. 1, there is illustrated a cutting assembly generally designated as 20. The specific kind of cutting assembly 20 illustrated is a grooving assembly. The illustration of a grooving assembly is not intended to restrict the scope of the invention. Further, the mention of the cutting assembly and cutting insert as a grooving assembly and grooving insert is not intended to restrict the scope of the invention. The kinds of cutting assemblies to which the invention relates includes, without limitation, a turning assembly, a cut-off tool assembly, and a face grooving assembly. The true scope and spirit of the invention is indicated by the claims hereof.

Figure 6:
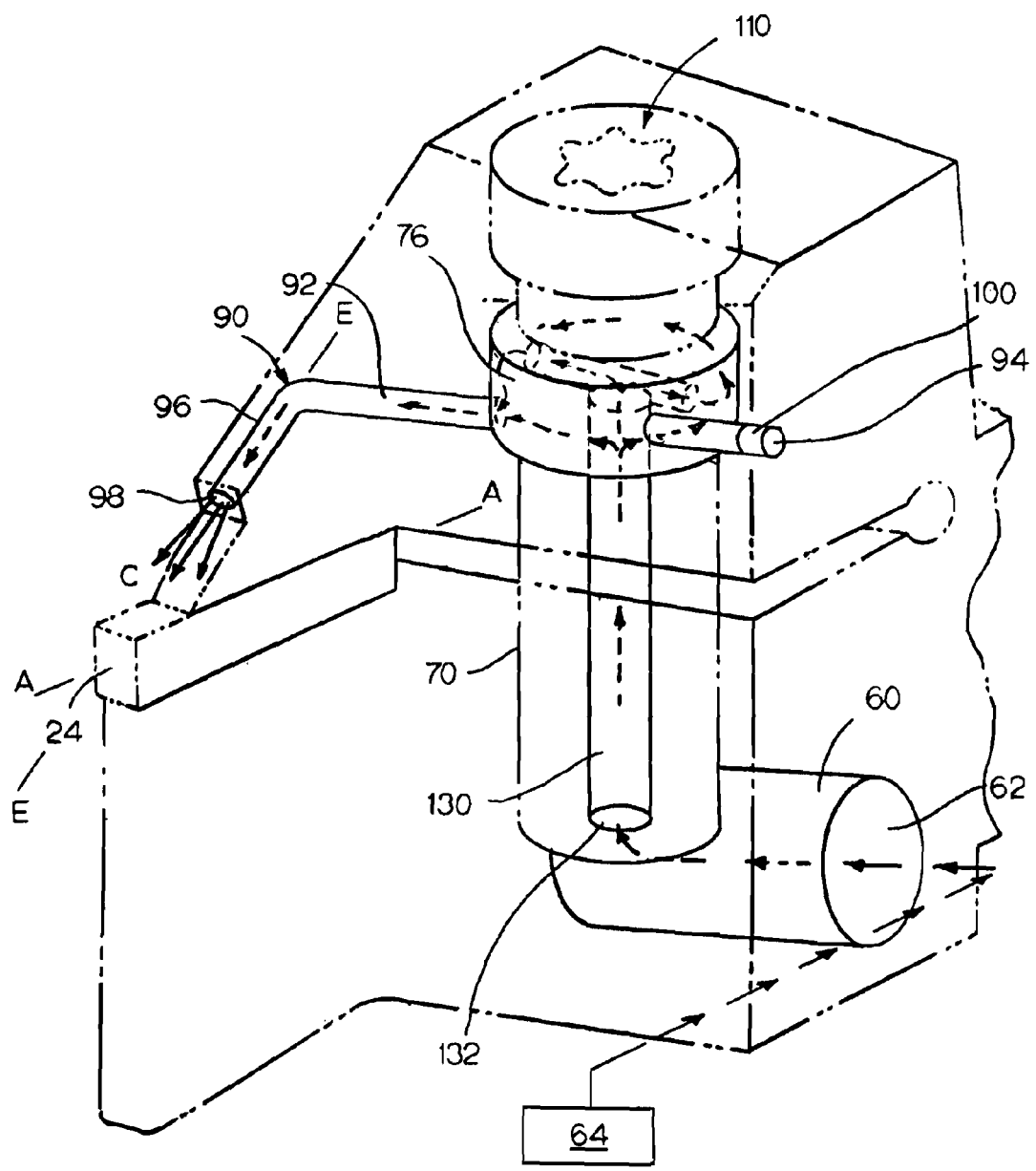
FIG. 6 is a schematic view showing the flow of coolant through the toolholder and onto the cutting insert.

Cutting (or grooving) assembly 20 comprises a toolholder 22 and a cutting insert (or grooving insert) 24. As shown in FIG. 6, the cutting insert 24 has a central longitudinal cutting insert axis A-A. As will be discussed hereinafter, the cutting insert is secured in the toolholder 22 such that the central longitudinal cutting insert axis A-A is generally perpendicular to the workpiece surface 162. The toolholder 22 has an axial forward end 28 and an axial rearward end 30. The toolholder 22 has a shank portion 32 at the axial rearward end 30 and a head portion 34 at the axial forward end 28.

The head portion 34 contains a slot 36. The slot 36 divides the head portion 34 into an upper section (see bracket 40) and a lower section (see bracket 42). The head portion 34 has a narrow (or thin) axial forward extension 44, which has a central longitudinal extension axis B-B (see FIG. 1). The narrow axial forward extension 44 forms a lower axial forward extension 44A and an upper axial forward extension 44B. The slot 36 separates the lower axial forward extension 44A and the upper axial forward extension 44B so they are movable relative to one another. The upper section 40 (in the form of the upper axial forward extension 44B) has an upper seat 46 in the vicinity of the axial forward extension 44. The lower section 42 (in the form of the lower axial forward extension 44A) has a lower seat 48 in the vicinity of the axial forward extension 44. The upper seat 46 and the lower seat 48 comprise a seating region generally designated as 50.

Figure 2:
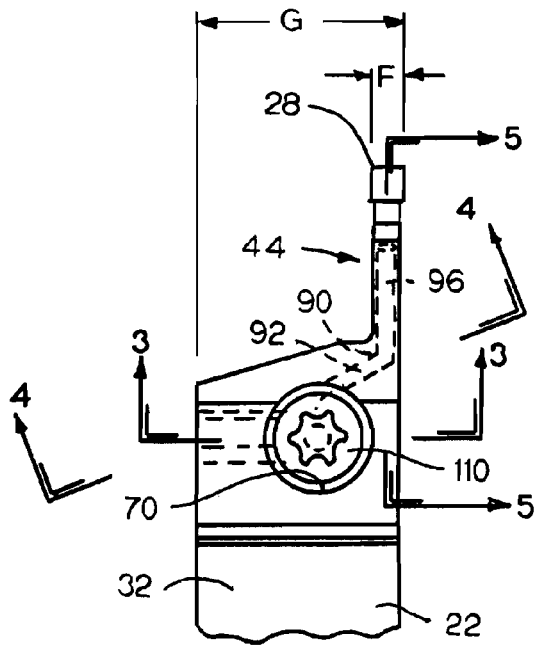
FIG. 2 is a top view of the head portion of the toolholder of FIG. 1.

The head portion 34 has a maximum transverse dimension "G" as shown in FIG. 2. The narrow axial forward extension 44 has a transverse dimension "F" as shown in FIG. 2. As shown in FIG. 2, the ratio (F/G) of the transverse dimension of the narrow axial forward extension to the maximum transverse dimension of the head portion is about 0.16. The ratio (F/G) of the transverse dimension of the narrow axial forward extension to the maximum transverse dimension of the head portion ranges between about 0.15 and about 0.50. In an alternate range, the range of F/G is between about 0.25 and about 0.40.

The head portion 34 has a top surface 52 and a selected side surface 54, which is visible in a drawing such as FIG. 1.

As will be described hereinafter, the coolant is delivered to the vicinity of the cutting insert-workpiece interface by discharging coolant from an opening in the narrow axial forward extension 44 of the head portion 34. Advantages result from discharging coolant directly at the cutting insert-workpiece interface throughout the entire cutting operation.

Figure 3:
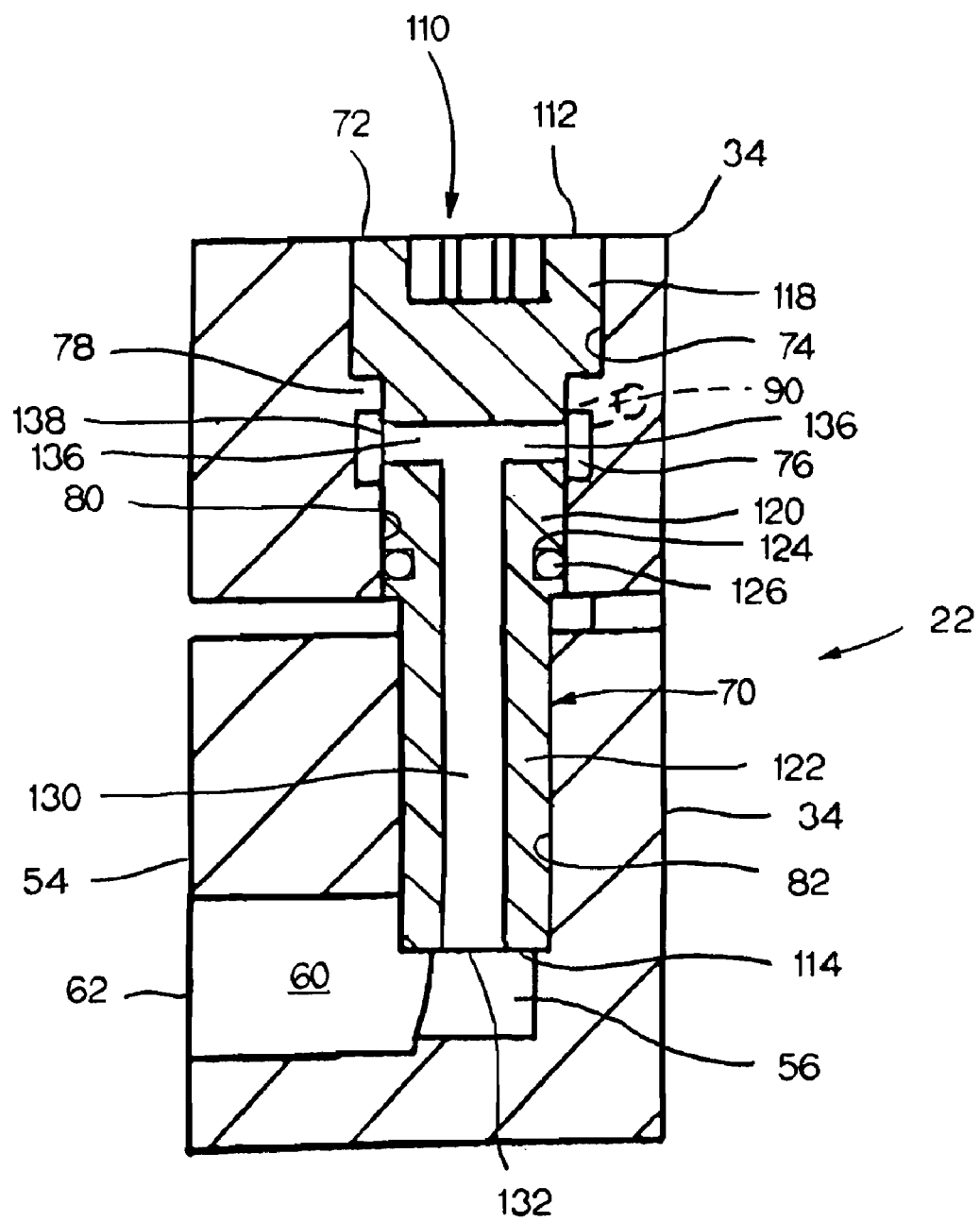
FIG. 3 is cross-sectional view of the head portion of the toolholder of FIG. 1 taken along section line 3-3 of FIG. 2.
Figure 4:
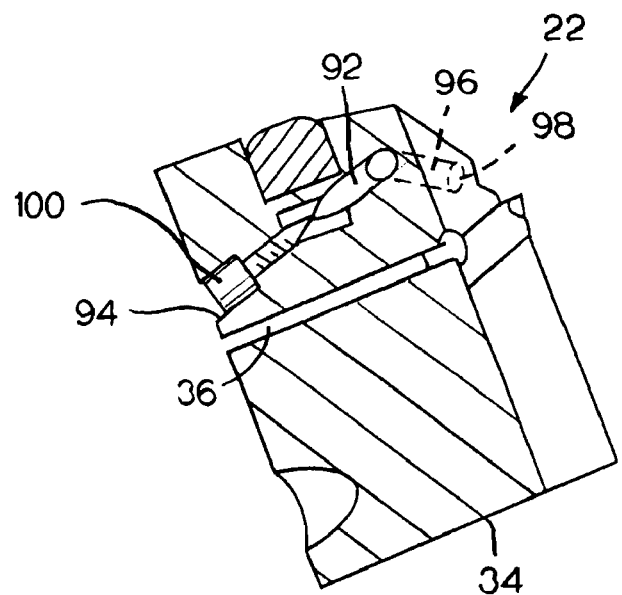
FIG. 4 is cross-sectional view of the head portion of the toolholder of FIG. 1 taken along section line 4-4 of FIG. 2.

Referring to FIG. 1 and FIG. 3, the head portion 34 contains a coolant entrance passage 60, which has an entrance opening 62 in the one side surface 54. As shown in FIG. 3, the coolant entrance passage 60 extends from the entrance opening 62 into the interior of the head portion 34. In particular, the coolant entrance passage 60 extends into the lower section 42 of the head portion 34, and it terminates in the interior of the lower section 42. The entrance opening 62 is in fluid communication with a source of coolant 64, which is shown in schematic, wherein the coolant source typically is under pressure.

The head portion 34 also contains a fastener bore 70, which has an open end 72 at the top surface 52 and extends into the interior of the head portion 34. The fastener bore 70 intersects the coolant entrance passage 60 wherein the region of intersection has the designation 56. It is in the region of intersection 56 that the fastener bore 70 terminates.

In reference to the geometry of the fastener bore 70 and in particular looking at FIG. 3, the fastener bore 70 has a counter bore section 74 adjacent to the open end 72. The fastener bore 70 further has a coolant reservoir section 76 wherein an annular shoulder 78 separates the counter bore section 74 from the coolant reservoir section 76. The fastener bore 70 further has an upper terminal bore section 80, which extends from the coolant reservoir section 76 to the slot 36. The fastener bore 70 further has a lower bore section 82 that extends from the slot 36 and terminates in the lower section 42 of the head portion 34 of the grooving toolholder 22. The lower bore section 82 terminates in such a fashion that it intersects the coolant entrance passage 60 in the intersection region 56. This intersection places the lower bore section 82 in fluid communication with the coolant entrance passage 60.

The upper section 40 of the head portion 34 contains a coolant delivery passage 90, which has a receiving section 92. The receiving section 92 has a generally transverse orientation and has an opening 94 at the one surface 54 of the head portion 34. A plug 100 (or the like) stops up the receiving section 92 at the opening 94. The receiving section 92 of the coolant delivery passage 90 travels from the opening 94 past the fastener bore 70 in such an orientation to intersect the coolant reservoir section 76. The receiving section 92 of the coolant delivery passage 90 is in fluid communication with the coolant reservoir section 76 of the fastener bore 70.

The coolant delivery passage 90 has a discharging section 96, which terminates at a discharge opening (or exit) 98. The discharging section 96 has a longitudinal coolant discharge axis E-E (see FIG. 6). The receiving section 92 is in fluid communication with the discharging section 96. Coolant discharges from the discharge opening 98 toward the cutting insert-workpiece interface from a position (or location) that is above the cutting insert-workpiece interface.

There should be an appreciation that the coolant discharges from the discharge opening 98 in a direction directly toward the cutting insert-workpiece interface. Keeping in mind that the cutting insert 24 is elongate with a central longitudinal axis, the coolant discharges the discharge opening 98 in a direction generally parallel to the central longitudinal axis of the elongate cutting insert 24 throughout the entire cutting operation. As will be discussed hereinafter, certain advantages arise from the discharge of the coolant directly to the vicinity of the cutting insert-workpiece interface throughout the entire cutting operation.

The fastener bore 70 receives an elongate fastener 110. The fastener 110 has a top (one) axial end 112 and an opposite bottom (other) axial end 114. The fastener 110 has a head section 118 adjacent to the top axial end 112. The fastener 110 further has a threaded shank section 122, as well as a mediate section 120 between the head section 118 and the shank section 122. The fastener 110 has a seal groove 124 in the mediate section 120 and the seal groove 124 carries a resilient seal 126. The seal 126 creates a fluid-tight seal with the upper terminal bore section 80. The fastener 110 contains an axial fastener bore 130 which has an open end 132 adjacent the bottom end 114 of the fastener 110. The fastener 110 further contains a transverse fastener bore 136, which intersects the axial fastener bore 130, and has openings 138.

Figure 5:
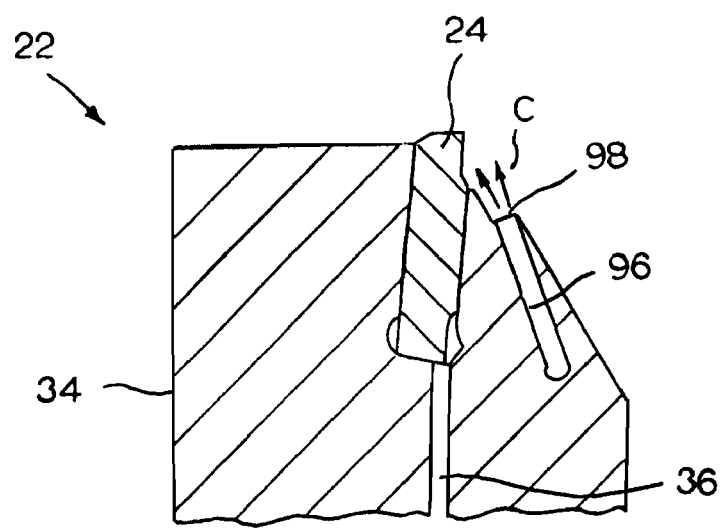
FIG. 5 is cross-sectional view of the head portion of the toolholder of FIG. 1 taken along section line 5-5 of FIG. 2.

Referring to FIG. 6, which is a schematic view showing the flow of coolant through the toolholder and onto the cutting insert, in operation, coolant under pressure from the coolant source 64 enters the coolant entrance passage 60 via the entrance opening 62. Coolant travels through the coolant entrance passage 60 and into the volume of the lower bore section 82. Coolant then passes into the axial fastener bore 130 via the open end 132 thereof. Coolant then travels up the axial fastener bore 130 and into the transverse fastener bore 136. Coolant exits the transverse fastener bore 136 at the openings 138 and into the coolant reservoir section 76. Coolant then enters into the receiving section 92 of the coolant delivery passage 90, and then into the discharging section 96 of the coolant delivery passage 90. Coolant, which is under pressure (see arrows "C" in FIGS. 5 and 6), then exits the discharge opening 98 in a direction toward the cutting insert 24.

Figures 7, 7A:
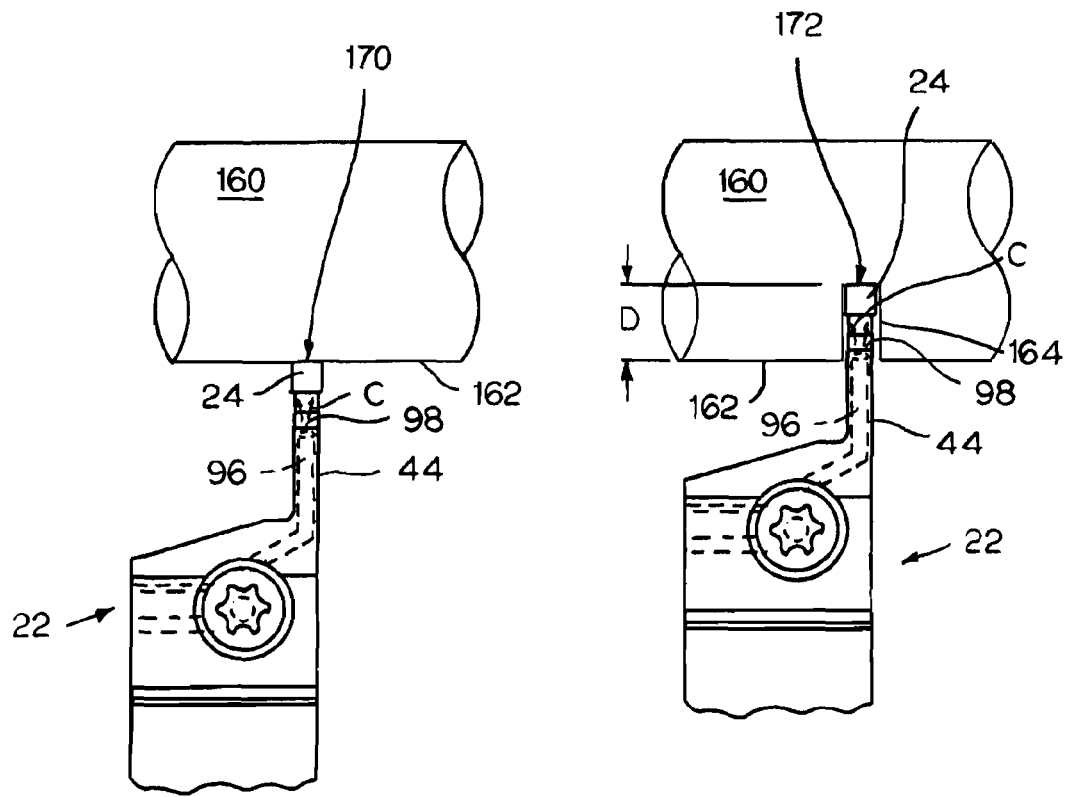
FIG. 7 is a schematic view of the cutting insert-workpiece interface when the cutting insert first contacts the workpiece.
FIG. 7A is a schematic view of the cutting insert-workpiece interface after a groove having a depth has been cut in the workpiece.

Referring to FIG. 7A and FIG. 7B, there are illustrated schematic views that show the relationship between the cutting insert 24 and the workpiece 160 (including the cutting insert-workpiece interface) at two points in time in the cutting operation. FIG. 7A shows the cutting insert-workpiece interface when the cutting insert 24 initially contacts or engages the outside diameter surface 162 of the workpiece 160. The workpiece 160 is shown as a cylindrical member. As one skilled in the art appreciates, during the cutting operation, the workpiece 160 rotates and the cutting insert 24 is urged radially inward toward the workpiece 160. The result is the formation (or cutting) of a groove 164 in the workpiece 160. FIG. 7B illustrates a groove 162, which has been cut to a depth "D".

During the entire cutting operation, it is important to deliver coolant to the cutting insert-workpiece interface. By the nature of the cutting operation that forms a groove, as the cutting operation progresses the cutting insert, which has an elongate geometry with a central longitudinal axis perpendicular to the surface of the workpiece, moves deeper into the workpiece. Further, as the cutting operation progresses, the cutting insert-workpiece interface moves deeper into the mass of the workpiece. As a result, it becomes more difficult to deliver coolant from an external side nozzle to the cutting insert-workpiece interface because the workpiece itself blocks coolant from reaching the cutting insert-workpiece interface. However, with the present invention, coolant discharges in a direction generally parallel to the central longitudinal axis of the cutting insert. This allows for the coolant to be delivered directly to the cutting insert-workpiece interface, and hence, the delivery of coolant has a higher level of efficiency. More coolant impinges the cutting insert-workpiece interface thereby providing for more efficient cooling of the cutting insert-workpiece interface.

Overall, it is apparent from the above description in connection with the drawings that the grooving assembly provides a grooving assembly that delivers coolant in an efficient fashion to the vicinity of the interface between the cutting insert and the workpiece. The delivery of coolant uses a fastener that provides a way for the coolant to traverse the slot in the toolholder.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A toolholder for retaining a cutting insert, the toolholder comprising:
    a toolholder body having an axial forward end and an axial rearward end, the toolholder body having an integral head region at the axial forward end and an integral shank region at the axial rearward end;
    the integral head region containing a slot separating the head region into a lower section and an upper section wherein the upper section is movable relative to the lower section, and the lower section defining a lower seat and the upper section defining an upper seat wherein the lower seat and the upper seat being adapted to retain a cutting insert there between;
    the integral head region containing a fastener bore defining a coolant reservoir section;
    the integral head region containing a coolant entrance passage in fluid communication with the fastener bore, and the integral head region containing a coolant delivery passage in fluid communication with the fastener bore, and the coolant delivery passage having an exit adapted to direct coolant to the cutting insert;
    a fastener being received within the fastener bore so as to pass through the slot and between the lower section and the upper section, and the fastener having an axial fastener bore with an inlet and an outlet, the axial fastener bore inlet being in fluid communication with the coolant entrance passage and the axial fastener bore outlet being in fluid communication with the fastener bore, and the fastener having a seal groove, and a seal being carried in the seal groove, and the seal continuously forming a fluid-tight seal between the fastener and the fastener bore at a location mediate of the coolant reservoir and the slot.

2. The toolholder according to claim 1 wherein the fastener further containing a transverse fastener bore intersecting the axial fastener bore, and the transverse fastener bore opening into the coolant reservoir section.

3. The toolholder according to claim 1 wherein the coolant delivery passage comprising a receiving section in fluid communication with the axial fastener bore, and the coolant delivery passage comprising a discharging section in fluid communication with the receiving section, and the discharging section terminating in the exit.

4. The toolholder according to claim 1 wherein the fastener being movable between a tightened condition wherein the lower section and upper section being drawn toward each other to retain the cutting insert between the lower seat and the upper seat and an untightened condition wherein the lower section and upper section are apart from one another to not retain the cutting insert between the lower seat and the upper seat.

5. The toolholder according to claim 1 wherein the head region has a narrow axial forward extension, at least a portion of the coolant delivery passage being in the narrow axial forward extension, and the exit being in the narrow axial forward extension.

6. The toolholder according to claim 5 wherein the head region has a maximum transverse dimension, the narrow axial forward extension has an extension transverse dimension, and the ratio of the extension transverse dimension to the maximum transverse dimension ranges between about 0.15 and about 0.50.

7. A cutting assembly comprising:
a toolholder and a cutting insert;
the toolholder having an axial forward end and an axial rearward end, the toolholder having an integral head region at the axial forward end and an integral shank region at the axial rearward end;
the integral head region containing a slot separating the head region into a lower section and an upper section wherein the upper section is movable relative to the lower section, and the lower section defining a lower seat and the upper section defining an upper seat wherein the lower seat and the upper seat being adapted to retain a cutting insert there between;
the integral head region containing a fastener bore defining a coolant reservoir section;
the integral head region containing a coolant entrance passage in fluid communication with the fastener bore, and the integral head region containing a coolant delivery passage in fluid communication with the fastener bore, and the coolant delivery passage having an exit adapted to direct coolant to the cutting insert;
a fastener being received within at least a portion of the fastener bore so as to pass through the slot and between the lower section and the upper section, and the fastener having an axial fastener bore with an inlet and an outlet, the axial fastener bore inlet being in fluid communication with the coolant entrance passage and the axial fastener bore outlet being in fluid communication with the fastener bore, and the fastener having a seal groove, and a seal being carried in the seal groove, and the seal continuously forming a fluid-tight seal between the fastener and the fastener bore at a location mediate of the coolant reservoir and the slot; and the fastener being movable between a tightened condition wherein the lower section and upper section being drawn toward each other to retain the cutting insert between the lower seat and the upper seat and an untightened condition wherein the lower section and upper section are apart from one another to not retain the cutting insert between the lower seat and the upper seat.

8. The toolholder assembly according to claim 7 wherein the fastener further containing a transverse fastener bore intersecting the axial fastener bore, and the transverse fastener bore opening into the coolant reservoir section.

9. The toolholder assembly according to claim 7 wherein the coolant delivery passage comprising a receiving section in fluid communication with the axial fastener bore, and the coolant delivery passage comprising a discharging section in fluid communication with the receiving section, and the discharging section terminating in the exit.

10. The toolholder assembly according to claim 7 wherein the head region has a narrow axial forward extension, at least a portion of the coolant delivery passage being in the narrow axial forward extension, and the exit being in the narrow axial forward extension.

11. A cutting assembly for removing material from a workpiece having a workpiece surface upon the cutting assembly engaging the workpiece at a cutting insert-workpiece interface, the assembly comprising:
a toolholder and an elongate cutting insert, the elongate cutting insert having a central longitudinal cutting insert axis wherein the central longitudinal cutting insert axis being generally perpendicular to the workpiece surface;
the toolholder having an axial forward end and an axial rearward end, the toolholder having an integral head region at the axial forward end and an integral shank region at the axial rearward end;
the integral head region having a narrow axial forward extension having a central longitudinal extension axis, the integral head region containing a slot separating the narrow axial forward extension into a lower axial forward extension section and an upper axial forward extension section wherein the upper axial forward extension section is movable relative to the lower axial forward extension section, and the lower axial forward extension section defining a lower seat and the upper axial forward extension section defining an upper seat wherein the lower seat and the upper seat being adapted to retain the elongate cutting insert there between such that the central longitudinal cutting insert axis being generally parallel with the central longitudinal extension axis;
the integral head region containing a fastener bore defining a coolant reservoir section;
the integral head region containing a coolant entrance passage in fluid communication with the fastener bore, and the upper axial forward extension section containing at least a portion of a coolant discharging section having a longitudinal coolant discharge axis;
a fastener being received within the fastener bore so as to pass through the slot and between the lower section and the upper section, and the fastener having an axial fastener bore with an inlet and an outlet, the axial fastener bore inlet being in fluid communication with the coolant entrance passage and the axial fastener bore outlet being in fluid communication with the fastener bore, and the fastener having a seal groove, and a seal being carried in the seal groove, and the seal continuously forming a fluid-tight seal between the fastener and the fastener bore at a location mediate of the coolant reservoir and the slot; and
the coolant discharging section being in fluid communication with the fastener bore, and the coolant discharging section having an exit in the upper axial forward extension section wherein the exit opens towards the cutting insert-workpiece interface so as to discharge coolant directly towards the cutting insert-workpiece interface.

12. The toolholder assembly according to claim 11 wherein the fastener further containing a transverse fastener bore intersecting the axial fastener bore, and the transverse fastener bore opening into the coolant reservoir section.

* * * * *